(12) United States Patent
Nakagawa

(10) Patent No.: US 11,507,032 B2
(45) Date of Patent: Nov. 22, 2022

(54) CONTROL DEVICE USING ARTIFICIAL INTELLIGENCE

(71) Applicant: Hitachi, Ltd., Tokyo (JP)

(72) Inventor: Shinji Nakagawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 311 days.

(21) Appl. No.: 16/758,106

(22) PCT Filed: Nov. 6, 2017

(86) PCT No.: PCT/JP2017/039861
§ 371 (c)(1),
(2) Date: Apr. 22, 2020

(87) PCT Pub. No.: WO2019/087374
PCT Pub. Date: May 9, 2019

(65) Prior Publication Data
US 2020/0341435 A1    Oct. 29, 2020

(51) Int. Cl.
*G05B 13/02* (2006.01)
*G06N 20/00* (2019.01)
(Continued)

(52) U.S. Cl.
CPC ..... *G05B 13/0265* (2013.01); *G05B 13/0205* (2013.01); *G06F 9/542* (2013.01);
(Continued)

(58) Field of Classification Search
CPC .................................................... G06N 20/00
(Continued)

(56) References Cited

U.S. PATENT DOCUMENTS 5,268,834 A * 12/1993 Sanner ................. G05B 13/027
706/23
5,479,119 A * 12/1995 Tice ........................ H03G 11/00
361/88
(Continued)

FOREIGN PATENT DOCUMENTS

JP    H03-123903 A    5/1991
JP    H05-297904 A    11/1993
(Continued)

OTHER PUBLICATIONS

Office Action issued in corresponding Japanese Patent Application No. 2019-550110 dated Jul. 13, 2021 with English translation.
(Continued)

*Primary Examiner* — Md Azad
(74) *Attorney, Agent, or Firm* — Foley & Lardner LLP

(57) ABSTRACT

A control device includes: an input information storage unit that stores track record input information that is information regarding an input signal having a track record; an artificial intelligence control unit that controls a control target using artificial intelligence based on the input signal; and an input signal evaluation unit that judges whether a value of the input signal is within a range having a track record based on the track record input information and, if the value of the input signal is within the range having the track record, permits transmission of the input signal to the artificial intelligence control unit. The safety of the control device using artificial intelligence is enhanced.

9 Claims, 20 Drawing Sheets

(51) Int. Cl.
*G06F 9/54* (2006.01)
*G06K 9/62* (2022.01)

(52) U.S. Cl.
CPC ......... *G06K 9/6223* (2013.01); *G06K 9/6262* (2013.01); *G06N 20/00* (2019.01)

(58) Field of Classification Search
USPC .......................................................... 700/28
See application file for complete search history.

(56) References Cited

U.S. PATENT DOCUMENTS

| | | | |
|---|---|---|---|
| 5,528,730 A | 6/1996 | Yagi | |
| 2010/0191697 A1* | 7/2010 | Fukumoto | G06N 5/04 706/54 |
| 2016/0247115 A1* | 8/2016 | Pons | G06K 7/10376 |
| 2019/0087736 A1* | 3/2019 | Kita | G06F 3/011 |
| 2019/0362219 A1* | 11/2019 | Scheffler | G06N 3/04 |

FOREIGN PATENT DOCUMENTS

| | | |
|---|---|---|
| JP | H06-124120 A | 5/1994 |
| JP | H07-210209 A | 8/1995 |
| JP | H09-233700 A | 9/1997 |
| JP | H10-074188 A | 3/1998 |
| JP | 2000-148206 A | 5/2000 |
| JP | 2001-034306 A | 2/2001 |

OTHER PUBLICATIONS

International Search Report with English translation and Written Opinion issued in corresponding application No. PCT/JP2017/039861 dated Dec. 12, 2017.

Office Action issued in corresponding Japanese Patent Application No. 2019-550110 dated Dec. 14, 2021 with English translation.

* cited by examiner

CONTROL DEVICE USING ARTIFICIAL INTELLIGENCE

TECHNICAL FIELD

The present invention relates to a control device, and particularly to a control device using artificial intelligence.

BACKGROUND ART

In various fields, control is performed in response to an input signal. For example, paragraph 0009 of PTL 1 describes that a control method switching device determines as to which output signal of each control device is used for control of a water supply control valve in accordance with a plant state, a normal/abnormal state of each control device and input signals to them, and a manual request from an operator.

CITATION LIST

Patent Literature

PTL 1: JP 05-297904 A

SUMMARY OF INVENTION

Technical Problem

In recent years, use of artificial intelligence for control devices has been examined. Artificial intelligence may be unclear in terms of processing details and can perform abnormal control even when the input signal is normal. However, the technique described in PTL 1 is to switch the control method in accordance with whether the input signal is normal or abnormal, and it does not consider the possibility of abnormal control being performed even if the input signal is normal.

An object of the present invention is to increase the safety of a control device using artificial intelligence.

Solution to Problem

In order to achieve the above object, the control device according to an aspect of the present invention includes: an input information storage unit that stores track record input information that is information regarding an input signal having a track record; an artificial intelligence control unit that controls a control target using artificial intelligence based on the input signal; and an input signal evaluation unit that judges whether a value of the input signal is within a range having a track record based on the track record input information and, if the value of the input signal is within the range having the track record, permits transmission of the input signal to the artificial intelligence control unit.

Advantageous Effects of Invention

According to an aspect of the present invention, the safety of the control device using the artificial intelligence can be improved.

DESCRIPTION OF EMBODIMENTS

Embodiments of the present invention will be described below with reference to the drawings.

First Embodiment

Figure 1:
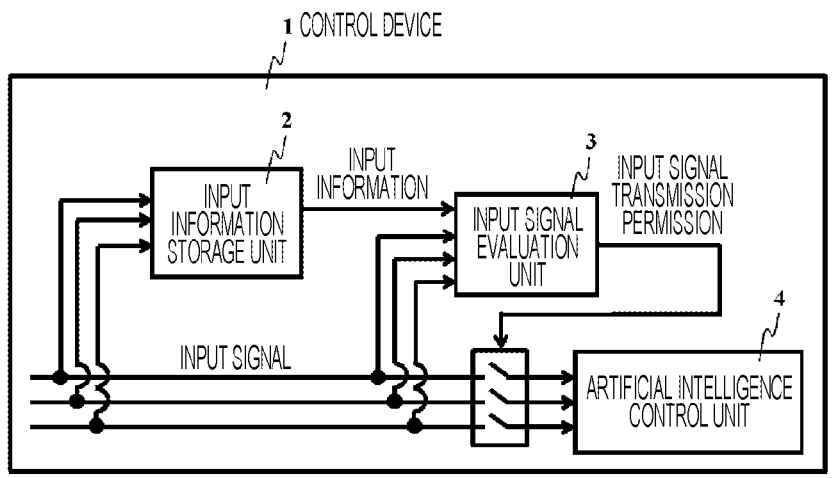
FIG. 1 is a block diagram of a control device according to a first embodiment.

FIG. 1 is a block diagram of the control device according to the first embodiment.

As illustrated in FIG. 1, a control device 1 according to the present embodiment has an input information storage unit 2, an input signal evaluation unit 3, and an artificial intelligence control unit 4. In the control device 1 configured as described above, the input information storage unit 2 stores track record input information serving as past information regarding an input signal, the input signal evaluation unit 3 compares the value of an input signal having been newly input with the track record input information stored in the input information storage unit 2, judges whether or not the value is within the range of an ever experienced content, and if the value of the input signal is within the range of the ever experienced content, transmits the input signal to the artificial intelligence control unit 4, and the artificial intelligence control unit 4 performs a machine learning-using control for a control target using artificial intelligence on the basis of the input signal.

Figure 2:
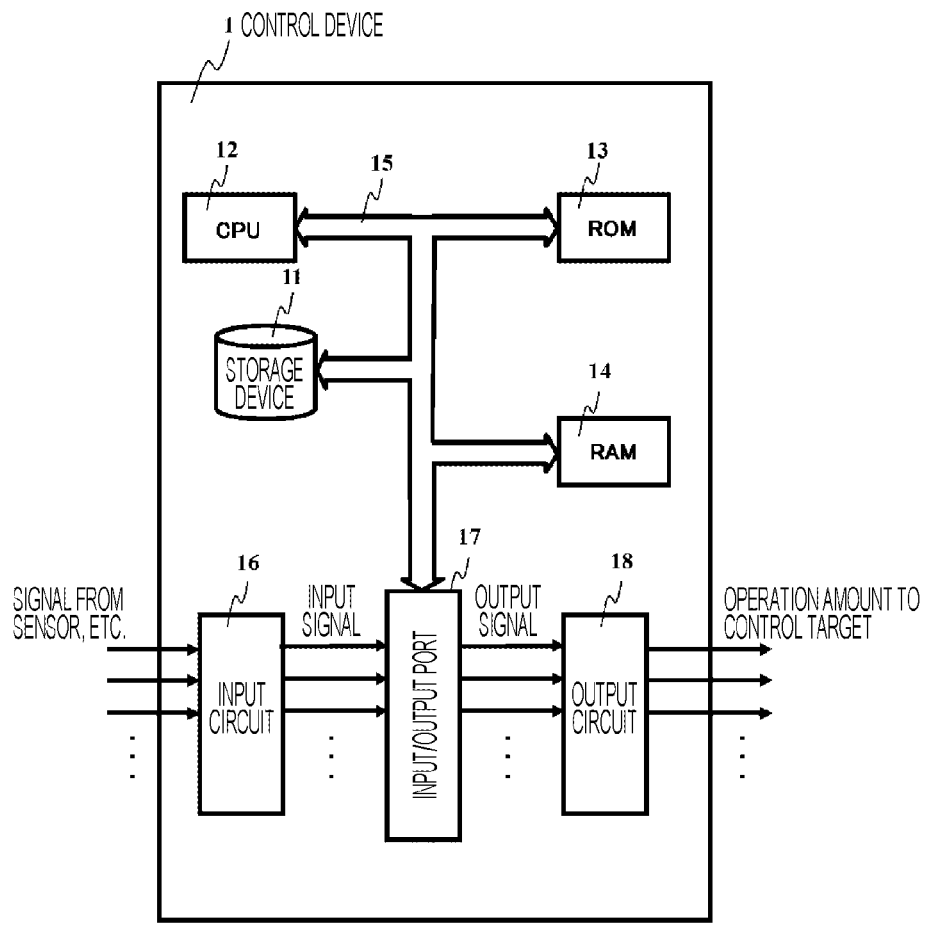
FIG. 2 is a system diagram illustrating a hardware configuration of the control device illustrated in FIG. 1.

FIG. 2 is a system diagram illustrating the hardware configuration of the control device 1 illustrated in FIG. 1.

As illustrated in FIG. 2, the control device 1 illustrated in FIG. 1 is provided with an input circuit 16 that processes external signals. The external signals here include a sensor signal installed in the control device 1, for example. These external signals become input signals via the input circuit 16 and are sent to an input/output port 17. Each piece of input information sent to the input/output port 17 is written in a RAM 14 or stored in a storage device 11 via a data bus 15. Processing described later is written in a ROM 13 or the storage device 11 and executed by a CPU 12. At this time, calculation is performed appropriately using a value written in the RAM 14 or the storage device 11. Of the calculation results, information (value) to be sent to the outside is sent to the input/output port 17 via the data bus 15 and sent to an output circuit 18 as an output signal. Then, the signal is output from the output circuit 18 to the outside as a signal to the outside. Here, the signal to the outside refers to an actuator signal or the like for causing the control target to perform a desired motion.

Figure 3:
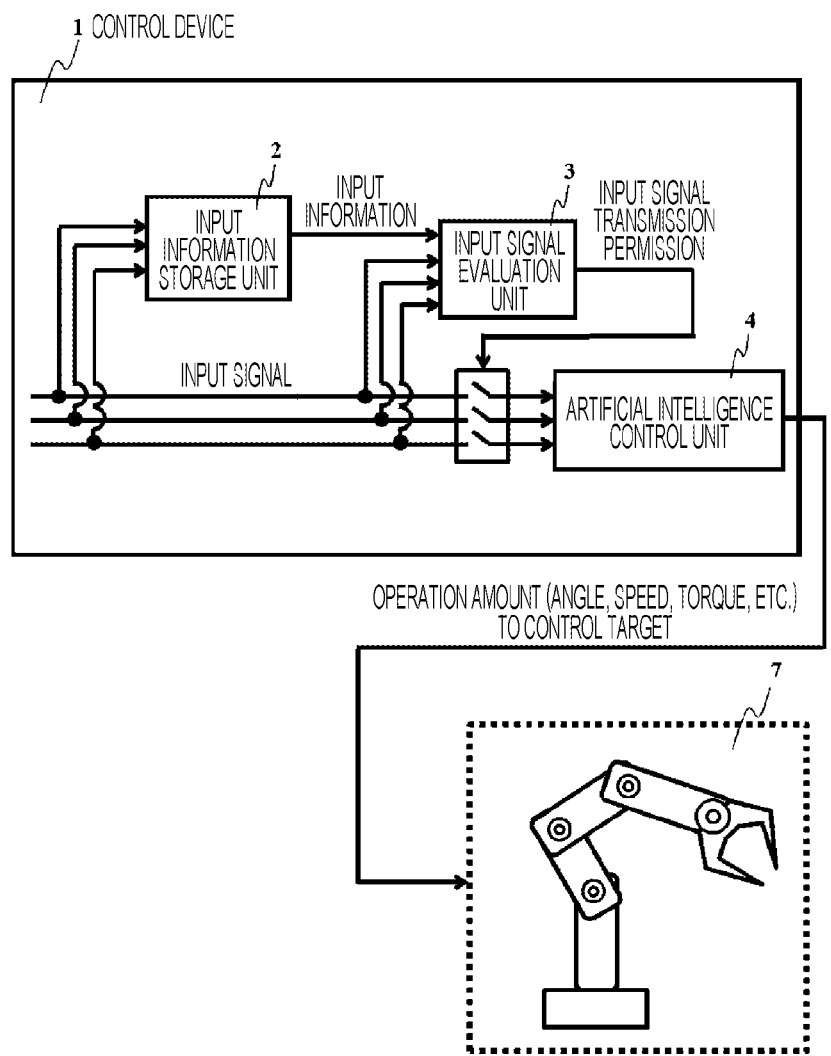
FIG. 3 is a diagram illustrating an embodiment in which a robot is controlled by the control device illustrated in FIG. 1.

FIG. 3 is a diagram illustrating an embodiment in which a robot is controlled by the control device 1 illustrated in FIG. 1.

As illustrated in FIG. 3, when a robot 7 is controlled by the control device 1 illustrated in FIG. 1, the artificial intelligence control unit 4 calculates an operation amount (e.g., target angle, target speed, target torque, etc.) for controlling the robot 7, and the robot 7 is controlled in accordance with the operation amount.

Hereinafter, details of the processing in each component illustrated in FIGS. 1 and 3 will be described.

Figure 4:
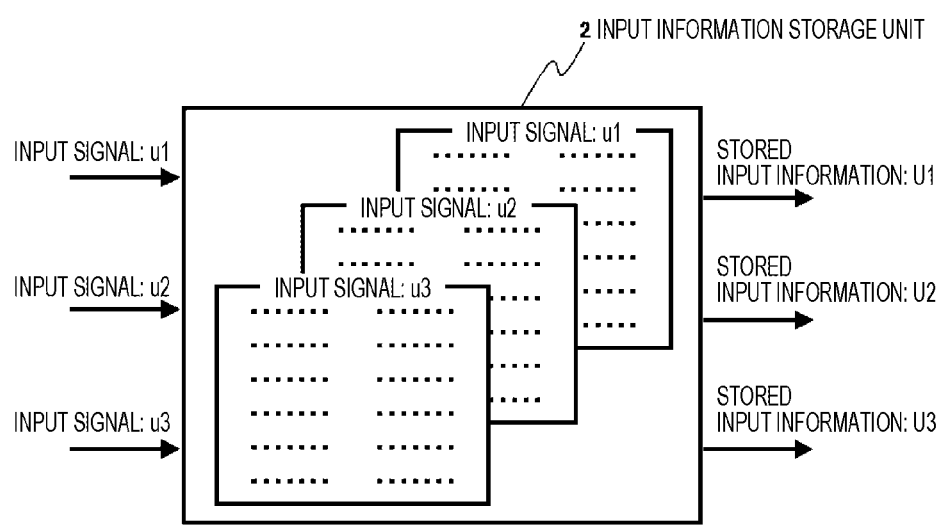
FIG. 4 is a diagram illustrating an image of an example of processing in an input information storage unit illustrated in FIG. 1.

FIG. 4 is a diagram illustrating an image of an example of processing in the input information storage unit 2 illustrated in FIG. 1.

As described above, the input information storage unit 2 illustrated in FIG. 1 stores track record input information serving as past information regarding the input signal. Specifically, as illustrated in FIG. 4, ever experienced input signals u1, u2, and u3 are stored in a database. Then, the stored input information is output as U1, U2, and U3, respectively. The storage means may be separately provided externally.

Figure 5:
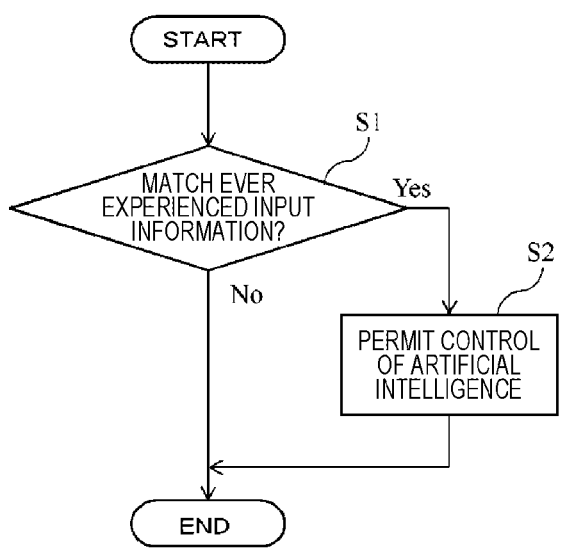
FIG. 5 is a flowchart presenting an example of processing in an input signal evaluation unit illustrated in FIG. 1.

FIG. 5 is a flowchart presenting an example of processing in an input signal evaluation unit 3 illustrated in FIG. 1.

The input signal evaluation unit 3 compares the value of the input signal with the track record input information stored in the input information storage unit 2, and judges whether or not the value is within the range of the ever experienced content.

Specifically, the input signal evaluation unit 3 compares the value of the input signal with the track record input information stored in the database in the input information storage unit 2 (Step 1), and if track record input information matching the value of the input signal exists, the input signal evaluation unit 3 permits transmission of the input signal to the artificial intelligence control unit 4 (Step 2). Thus, the artificial intelligence control unit 4 is caused to control the control target by the input signal.

On the other hand, if track record input information matching the value of the input signal does not exist, the transmission of the input signal to the artificial intelligence control unit 4 is not permitted.

Figure 6:
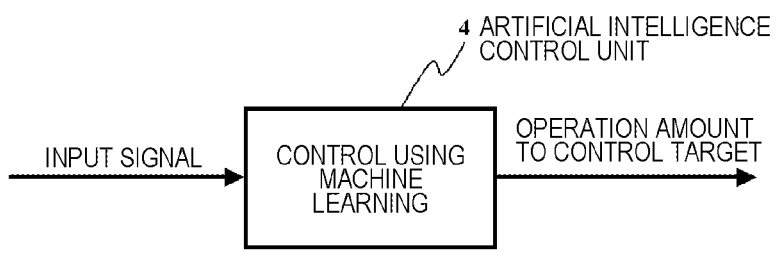
FIG. 6 is a diagram illustrating an image of an example of processing in an artificial intelligence control unit illustrated in FIG. 1.

FIG. 6 is a diagram illustrating an image of an example of processing in the artificial intelligence control unit 4 illustrated in FIG. 1.

The artificial intelligence control unit 4 illustrated in FIG. 1 calculates the operation amount to the control target by control using artificial intelligence (machine learning). Specifically, as illustrated in FIG. 6, the artificial intelligence control unit 4 calculates the operation amount to the control target (operation amount for controlling the robot 7 in the present embodiment) by control using machine learning on the basis of a sensor signal or the like. Although control using machine learning is not described in detail here because there are many known techniques, it is conceivable, for example, to model a control target by a neural network (deep learning) and to perform predictive control and inverse model control.

According to the present embodiment, information regarding an ever experienced input signal having a track record is stored in a database as track record input information, whether or not a new input signal is an ever experienced input signal is judged on the basis of the database, the input signal is transmitted to a control method using artificial intelligence on the basis of the result, and control to a control target is executed by the artificial intelligence, and hence a control method using artificial intelligence in which the content of processing is often unclear performs processing in consideration of the possibility of performing an abnormal operation even if the input signal is normal, and is capable of reducing abnormal control by the control device using artificial intelligence, thereby achieving both performance and safety.

Second Embodiment

The control device according to the present embodiment is different from that presented in the first embodiment in terms of processing in the input information storage unit 2 and the input signal evaluation unit 3.

Figure 7:
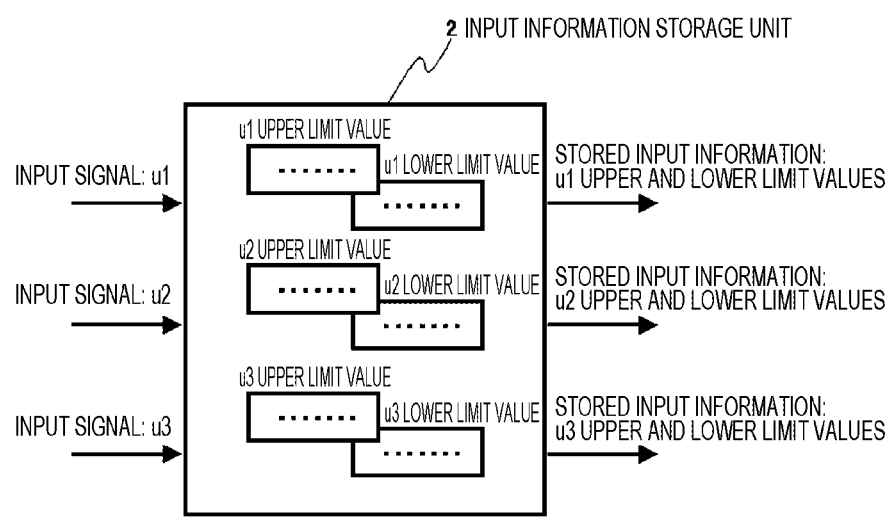
FIG. 7 is a diagram illustrating an image of an example of processing in the input information storage unit according to a second embodiment.

FIG. 7 is a diagram illustrating an image of an example of processing in the input information storage unit 2 according to the second embodiment.

As illustrated in FIG. 7, the input information storage unit 2 of the control device according to the present embodiment calculates the maximum value and the minimum value of the ever experienced input signals u1, u2, and u3 having a track record, and stores the maximum value as the upper limit value and the minimum value as the lower limit value. Then, the stored input information is output as U1, U2, and U3, respectively. The storage means may be separately provided externally.

Figure 8:
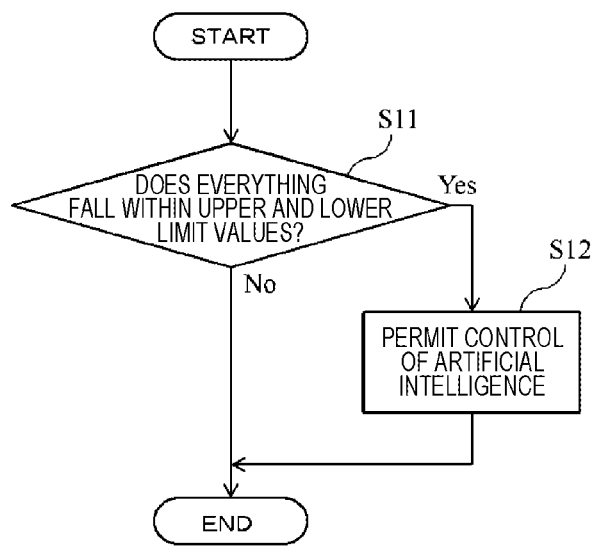
FIG. 8 is a flowchart presenting an example of processing in an input signal evaluation unit according to the second embodiment.

FIG. 8 is a flowchart presenting an example of processing in an input signal evaluation unit 3 according to the second embodiment.

The input signal evaluation unit 3 compares the value of the input signal with the track record input information stored in the input information storage unit 2, and judges whether or not the value is within the range of the ever experienced content.

Specifically, the value of the input signal is compared with the upper and lower limit values of the track record input information stored in the input information storage unit 2 (Step 11), and if all of the input signals fall within the range of the upper and lower limit values equal to or greater than the lower limit value and equal to or smaller than the upper limit value, the transmission of the input signal to the artificial intelligence control unit 4 is permitted (Step 12). Thus, the artificial intelligence control unit 4 is caused to control the control target by the input signal.

On the other hand, if at least one of the input signals does not fall within the range of the upper and lower limit values, the transmission of the input signal to the artificial intelligence control unit 4 is not permitted.

According to the present embodiment, the upper and lower limit values of ever experienced input signals having track records are stored as track record input information, whether or not a new input signal is an ever experienced input signal is judged on the basis of the upper and lower limit values, the input signal is transmitted to a control method using artificial intelligence on the basis of the result, and control to a control target is executed by the artificial intelligence, and hence a control method using artificial intelligence in which the content of processing is often unclear performs processing in consideration of the possibility of performing an abnormal operation even if the input signal is normal, and is capable of reducing abnormal control by the control device using artificial intelligence, thereby achieving both performance and safety. At this time, since the track records of the input signals are stored in an aggregated manner into the upper limit value and the lower limit value, it is possible to reduce the data amount stored in the input information storage unit 2.

Third Embodiment

The control device according to the present embodiment is different from that presented in the first embodiment in terms of processing in the input information storage unit 2 and the input signal evaluation unit 3.

Figure 9:
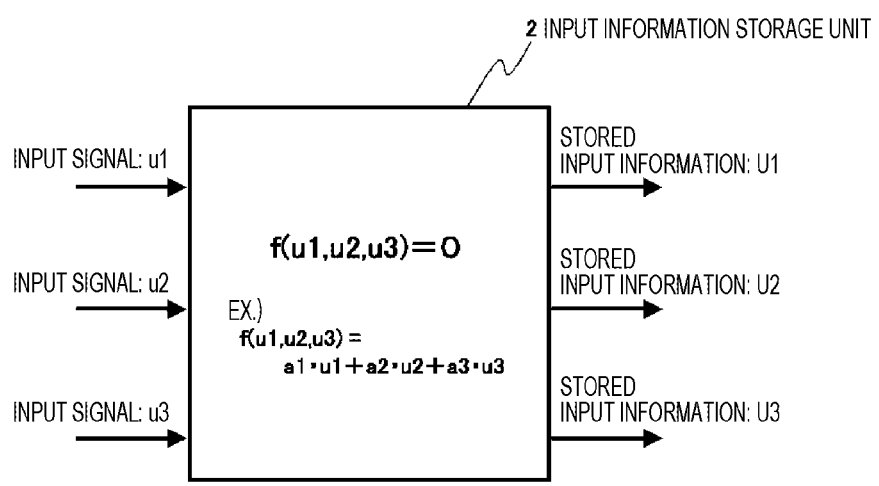
FIG. 9 is a diagram illustrating an image of an example of processing in the input information storage unit according to a third embodiment.

FIG. 9 is a diagram illustrating an image of an example of processing in the input information storage unit 2 according to the third embodiment.

As illustrated in FIG. 9, the input information storage unit 2 of the control device according to the present embodiment calculates an approximate function that approximates the values of the ever experienced input signals u1, u2, and u3 having a track record, and stores approximate function information indicating the approximate function. Here, a linear function (linear combination) or the like is considered as a function used for approximation. As a method of determining the value of the parameter, for example, the least square method is considered. Then, when the input signals u1, u2, and u3 are given, the input information storage unit 2 calculates approximate values (estimate values of u1, u2, and u3 calculated by the approximate function) by the approximate function indicated by the approximate function information, and outputs the approximate values as the input information U1, U2, and U3, respectively. The storage means may be separately provided externally.

Figure 10:
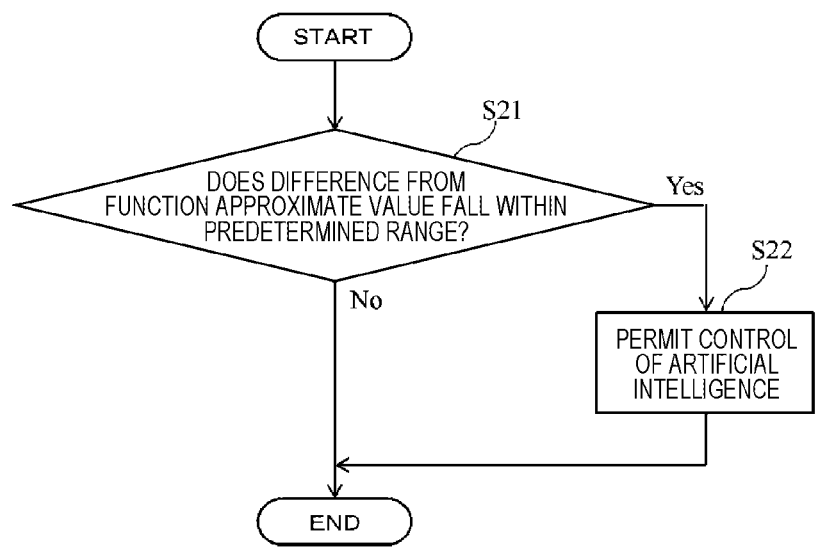
FIG. 10 is a flowchart presenting an example of processing in an input signal evaluation unit according to the third embodiment.

FIG. 10 is a flowchart presenting an example of processing in an input signal evaluation unit 3 according to the third embodiment.

The input signal evaluation unit 3 compares the value of the input signal with the track record input information stored in the input information storage unit 2, and judges whether or not the value is within the range of the ever experienced content.

Specifically, the value of the input signal is compared with the function approximate value stored in the input information storage unit 2 (Step 21), and if the difference between the input signal and the value indicated by the approximate function falls within a predetermined range, transmission of the input signal to the artificial intelligence control unit 4 is permitted (Step 22). Thus, the artificial intelligence control unit 4 is caused to control the control target by the input signal. On the other hand, if the difference between the input signal and the approximate function does not fall within the predetermined range, the transmission of the input signal to the artificial intelligence control unit 4 is not permitted.

According to the present embodiment, information of an approximate function that approximates an ever experienced input signal having a track record is stored, whether or not a new input signal is within a predetermined range of an ever experienced input signal is judged on the basis of the difference from the value indicated by the approximate function, the input signal is transmitted to a control method using artificial intelligence on the basis of the result, and control to a control target is executed by the artificial intelligence. Hence, a control method using artificial intelligence in which the content of processing is often unclear performs processing in consideration of the possibility of performing an abnormal operation even if the input signal is normal, and is capable of reducing abnormal control by the control device using artificial intelligence, thereby achieving both performance and safety. At this time, since the track records of the input signals are stored in an aggregated manner as an approximate function, it is possible to reduce the data amount stored in the input information storage unit 2.

Fourth Embodiment

The control device according to the present embodiment is different from that presented in the first embodiment in terms of processing in the input information storage unit 2 and the input signal evaluation unit 3.

Figure 11:
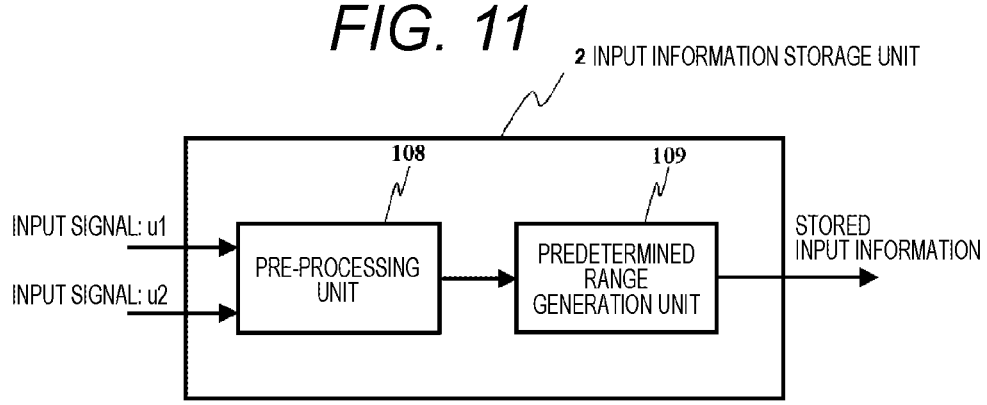
FIG. 11 is a diagram illustrating an image of an example of processing in the input information storage unit according to a fourth embodiment.

FIG. 11 is a diagram illustrating an image of an example of processing in the input information storage unit 2 according to the fourth embodiment.

As illustrated in FIG. 11, the input information storage unit 2 of the control device according to the present embodiment has a pre-processing unit 108 and a predetermined range generation unit 109, and clusters the values of the input signals having track records, divides them into one or more data sets, determines a data range related to the data set, and stores information of the data range.

Figure 12:
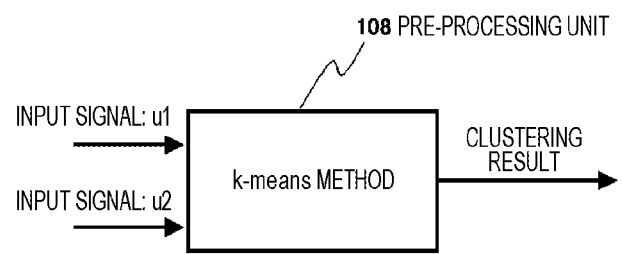
FIG. 12 is a diagram illustrating an image of processing in a pre-processing unit according to the fourth embodiment.

FIG. 12 is a diagram illustrating an image of processing in the pre-processing unit 108 according to the fourth embodiment.

As illustrated in FIG. 12, using the machine learning k-means, the pre-processing unit 108 illustrated in FIG. 11 clusters the vectorized input signals u1 and u2. Then, the division information obtained by the k-means method is output. The division information here refers to the cluster number to which the data divided by the k-means method belongs and the mean value (center vector) of the data belonging to each cluster. The details of the k-means method are not described here because they have been described in many literatures and books.

Figure 13:
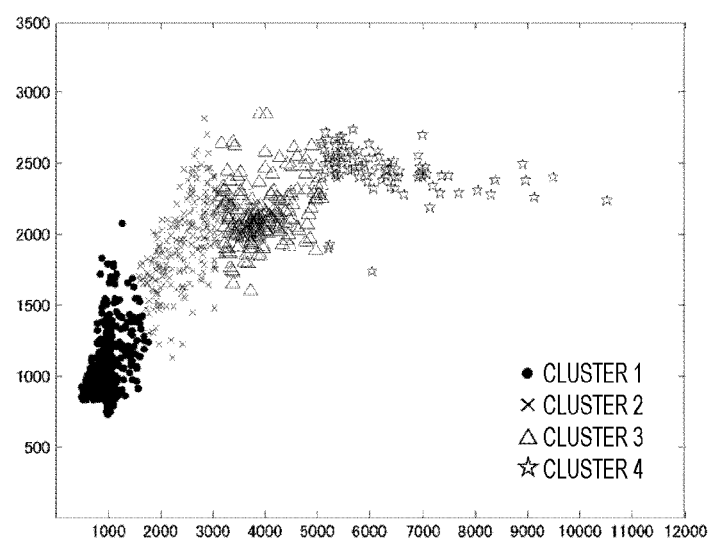
FIG. 13 is a chart illustrating an example of a result of clustering a data group consisting of two-dimensional vectors by the k-means method with the number of clusters of 4.

FIG. 13 is a chart illustrating an example of a result of clustering a data group consisting of two-dimensional vectors by the k-means method with the number of clusters of 4.

Figure 14:
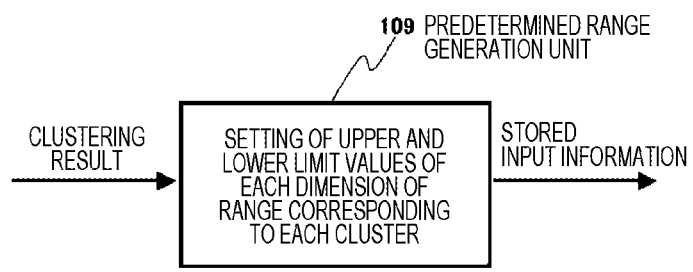
FIG. 14 is a diagram illustrating an image of processing in a predetermined range generation unit according to the fourth embodiment.

FIG. 14 is a diagram illustrating an image of processing in the predetermined range generation unit 109 according to the fourth embodiment.

As illustrated in FIG. 14, using the division information calculated by the pre-processing unit 108, the predetermined range generation unit 109 illustrated in FIG. 11 sets a data range for each divided input signal set, and stores the result as the track record input information. Specifically, the minimum value of each dimension of data belonging to each cluster is set as the lower limit of each dimension of the range corresponding to each cluster, and the maximum value of each dimension of data belonging to each cluster is set as the upper limit of each dimension of the range corresponding to each cluster. The range information here refers to the lower limit value and the upper limit value of each dimension defining the range corresponding to each cluster (center vector).

Figure 15:
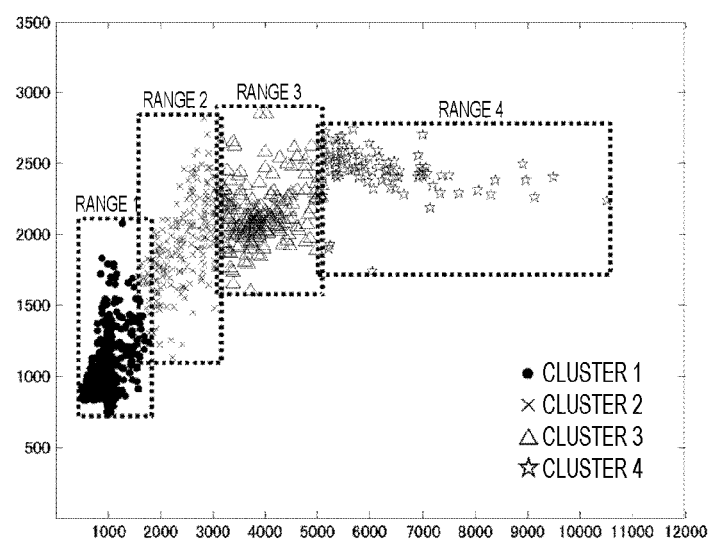
FIG. 15 is a chart illustrating an example of a result of setting a range in the predetermined range generation unit on the basis of the division result illustrated in FIG. 13.

FIG. 15 is a chart illustrating an example of a result of setting a range in the predetermined range generation unit 109 on the basis of the division result illustrated in FIG. 13.

The information of the range set and stored in the predetermined range generation unit 109 is output as the stored input information. The storage means may be separately provided externally.

Figure 16:
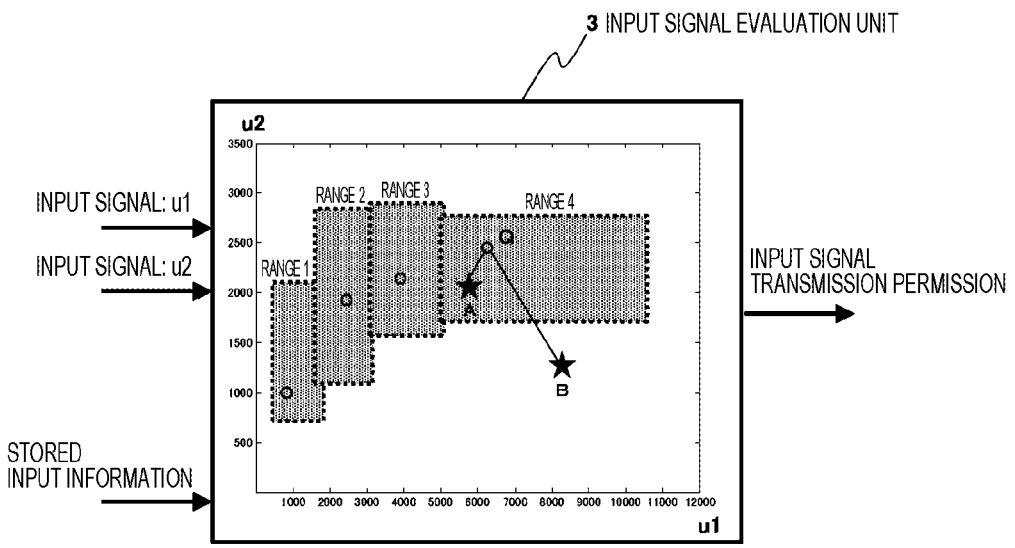
FIG. 16 is a diagram for explaining an example of processing in the input signal evaluation unit according to the fourth embodiment.

FIG. 16 is a diagram for explaining an example of processing in the input signal evaluation unit 3 according to the fourth embodiment.

The input signal evaluation unit 3 according to the present embodiment compares the value of the input signal with the track record input information stored in the input information storage unit 2, judges whether or not the value of the input signal is within the ever experienced data range, and if the value of the input signal is within the data range, permits transmission of the input signal to the artificial intelligence control unit 4. Specifically, as illustrated in FIG. 16, a center vector having the shortest distance with respect to a new input signal (vector [u1, u2]) is specified with reference to ever experienced input information (predetermined range information).

Then, if a new input signal (vector [u1, u2]) exists within the range corresponding to the specified center vector, transmission of the input signal to the artificial intelligence control unit 4 is permitted.

On the other hand, if a new input signal (vector [u1, u2]) does not exist within the range corresponding to the specified center vector, transmission of the input signal to the artificial intelligence control unit 4 is not permitted.

For example, if the vector of the input signal is at points A and B in FIG. 16, a center vector Q closest to the point A is specified, and the point A exists within a range 4 corresponding to the center vector Q, but the point B does not exist in the range 4.

According to the present embodiment, the value of an ever experienced input signal having a track record is clustered into one or more data sets, a data range related to the data set is determined, whether or not the input signal is within the data range is judged, the input signal is transmitted to a control method using artificial intelligence on the basis of the result, and control to a control target is executed by the artificial intelligence, and hence a control method using artificial intelligence in which the content of processing is often unclear performs processing in consideration of the possibility of performing an abnormal operation even if the input signal is normal, and is capable of reducing abnormal control by the control device using artificial intelligence, thereby achieving both performance and safety. At this time, since the track records of the input signals are stored in an aggregated manner in a data range, it is possible to reduce the data amount stored in the input information storage unit 2.

Fifth Embodiment

Figure 17:
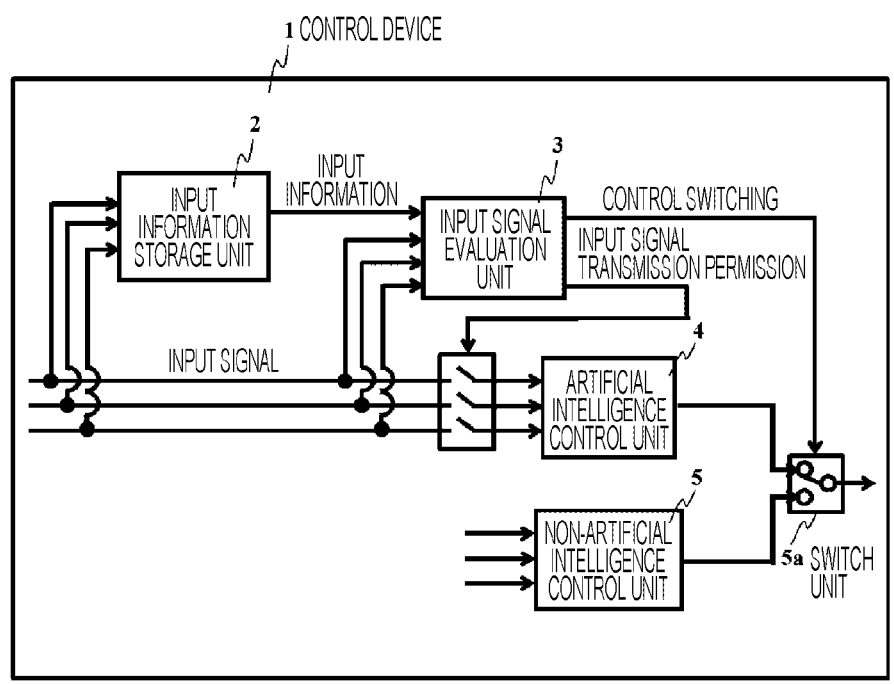
FIG. 17 is a block diagram of the control device according to a fifth embodiment.

FIG. 17 is a block diagram of the control device according to the fifth embodiment.

As illustrated in FIG. 17, the control device according to the present embodiment is different from that presented in the first embodiment in terms of having the non-artificial intelligence control unit 5 and a switch unit 5a as well as the processing in the input signal evaluation unit 3. The input signal evaluation unit 3 compares the value of the input signal with the track record input information stored in the input information storage unit 2, judges whether or not the value of the input signal is within the range of the ever experienced content, and if the value of the input signal is not within the range of the ever experienced content, controls the switch unit 5a so as to stop the transmission of the input signal to the artificial intelligence control unit 4 and switches to PID control by the non-artificial intelligence control unit 5. At this time, if the input signal evaluation unit 3 outputs switching using the switch unit 5a by voice or the like, the operator can know whether it is control performed by the artificial intelligence control unit 4 or PID control performed by the non-artificial intelligence control unit 5. The artificial intelligence control unit 4 performs control using machine learning in the same manner as described above, and the non-artificial intelligence control unit 5 performs control using PID control. The input information storage unit 2 performs the same processing as that presented in the fourth embodiment.

Figure 18:
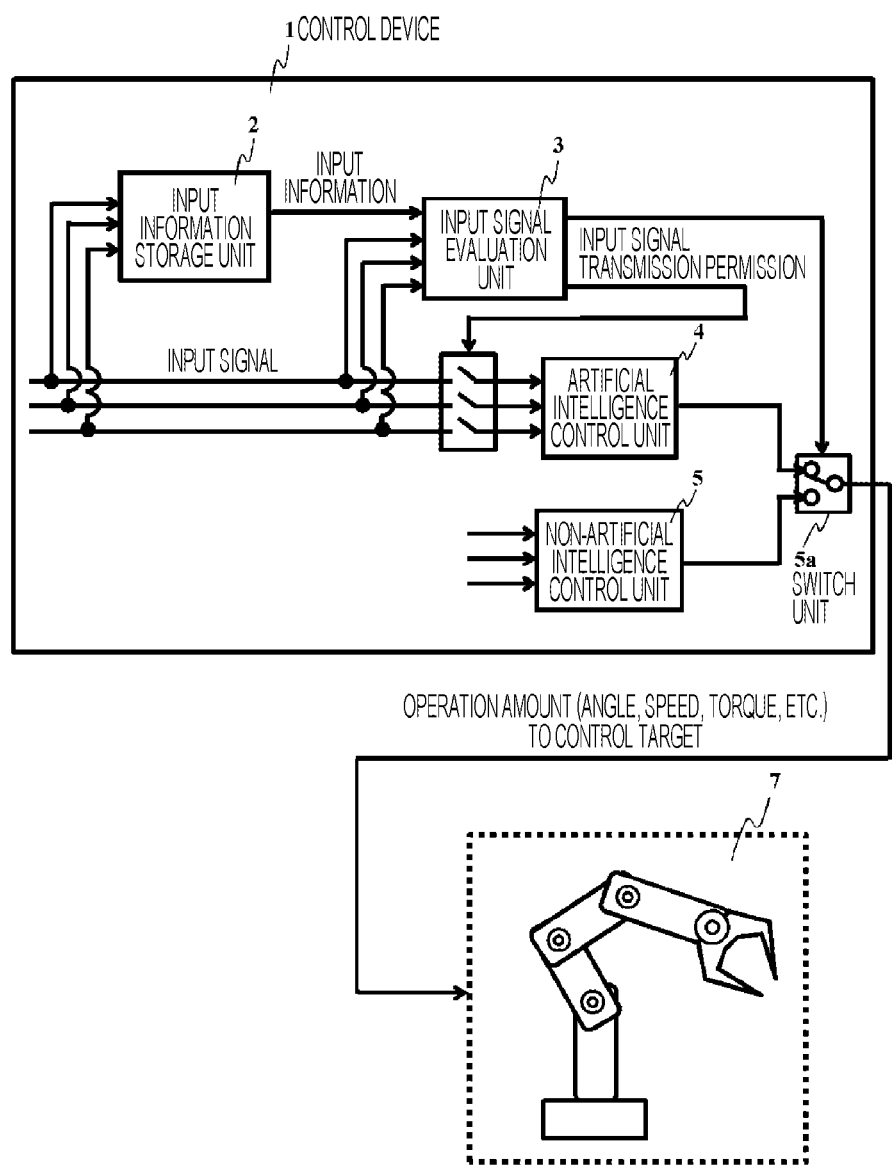
FIG. 18 is a diagram illustrating an embodiment in which a robot is controlled by the control device illustrated in FIG. 17.

FIG. 18 is a diagram illustrating an embodiment in which a robot is controlled by the control device 1 illustrated in FIG. 17.

As illustrated in FIG. 18, when the robot 7 is controlled by the control device 1 illustrated in FIG. 17, the artificial intelligence control unit 4 or the non-artificial intelligence control unit 5 calculates the operation amount (e.g., target angle, target speed, target torque, etc.) for controlling the robot 7, and the robot 7 is controlled in accordance with the operation amount.

Figure 19:
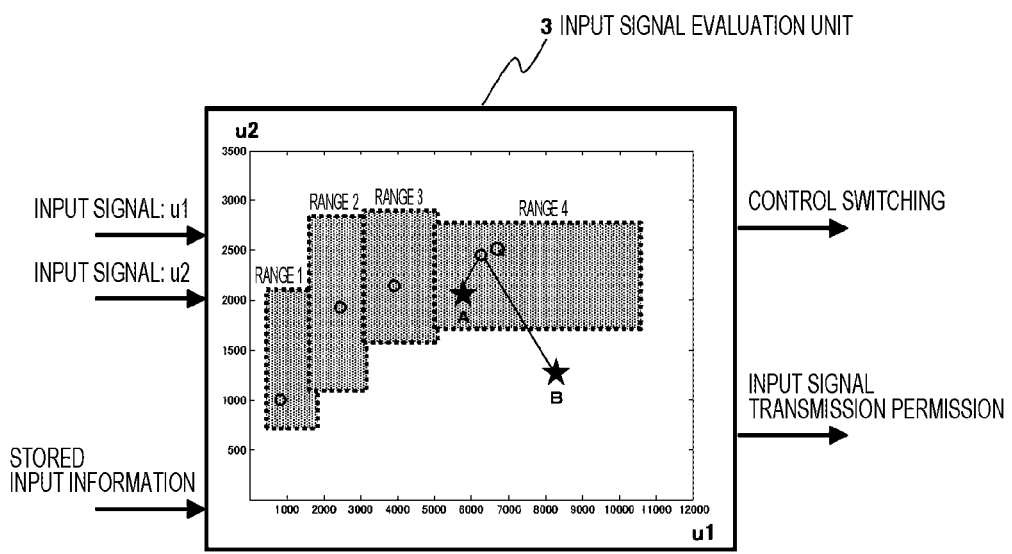
FIG. 19 is a diagram for explaining an example of processing in the input signal evaluation unit illustrated in FIG. 17.

FIG. 19 is a diagram for explaining an example of processing in the input signal evaluation unit 3 illustrated in FIG. 17.

The input signal evaluation unit 3 according to the present embodiment compares the value of the input signal with the track record input information stored in the input information storage unit 2, judges whether or not the value of the input signal is within the ever experienced data range, and if the value of the input signal is within the data range, permits transmission of the input signal to the artificial intelligence control unit 4, causes the artificial intelligence control unit 4 to control the control target, and if the value of the input signal is not within the data range, causes the non-artificial intelligence control unit 5 to control the control target. Specifically, as illustrated in FIG. 19, a center vector having the shortest distance with respect to a new input signal (vector [u1, u2]) is specified with reference to ever experienced input information (predetermined range information).

Then, if a new input signal (vector [u1, u2]) exists within the range corresponding to the specified center vector, transmission of the input signal to the artificial intelligence control unit 4 is permitted.

On the other hand, if a new input signal (vector [u1, u2]) does not exist within the range corresponding to the specified center vector, control without using artificial intelligence is adopted as the control method, and transmission of the input signal to the artificial intelligence control unit 4 is not permitted.

For example, if the vector of the input signal is at points A and B in FIG. 19, the center vector Q closest to the point A is specified, and the point A exists within the range 4 corresponding to the center vector Q, but the point B does not exist in the range 4.

Figure 20:
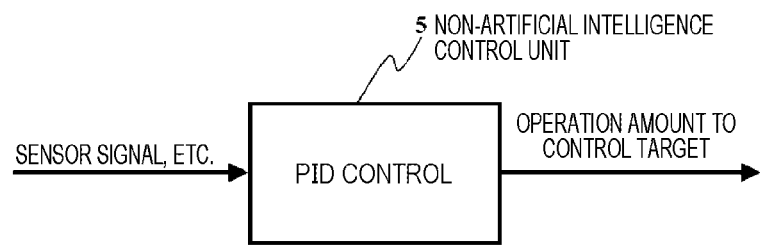
FIG. 20 is a diagram illustrating an image of an example of processing in a non-artificial intelligence control unit illustrated in FIG. 17.

FIG. 20 is a diagram illustrating an image of an example of processing in the non-artificial intelligence control unit 5 illustrated in FIG. 17.

The non-artificial intelligence control unit 5 according to the present embodiment calculates the operation amount to the control target by PID control, which is a control different from artificial intelligence, for example. Specifically, as illustrated in FIG. 20, the operation amount (operation amount for controlling the robot 7 in the present embodiment) to the control target is calculated by PID control on the basis of a sensor signal or the like. The PID control is not described in detail here because there are many known techniques.

According to the present embodiment, the range of the ever experienced input signal having a track record is stored, whether or not the value of the input signal is within the range is judged, and if the value of the input signal is not within the range of the ever experienced content, transmission of a new input signal to the artificial intelligence control unit 4 is stopped and the control method is switched to PID control as a control without using artificial intelligence, and hence a control method using artificial intelligence in which the content of processing is often unclear performs processing of emergency response control as well as in consideration of the possibility of performing an abnormal operation even if the input signal is normal, and is capable of reducing abnormal control by the control device using artificial intelligence, thereby achieving both performance and safety.

Sixth Embodiment

The control device according to the present embodiment is different from that presented in the fifth embodiment in terms of processing in the non-artificial intelligence control unit 5.

Figure 21:
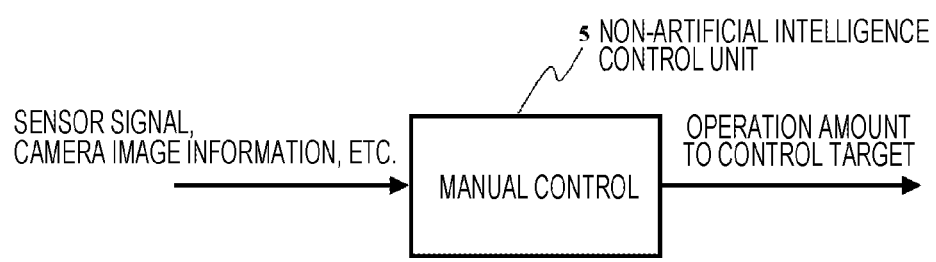
FIG. 21 is a diagram illustrating an image of an example of processing in a non-artificial intelligence control unit 5 according to the sixth embodiment.

FIG. 21 is a diagram illustrating an image of an example of processing in the non-artificial intelligence control unit 5 according to the sixth embodiment.

The non-artificial intelligence control unit 5 according to the present embodiment calculates the operation amount to the control target by manual control, which is a control different from artificial intelligence, for example. Specifically, as illustrated in FIG. 21, the operation amount (operation amount for controlling the robot 7 in the present embodiment) to the control target is calculated by manual control on the basis of a sensor signal, information of a camera image, or the like. The manual control here refers to manual control by the operator of the robot.

The input information storage unit 2 performs the same processing as that presented in the fourth embodiment, and the input signal evaluation unit 3 compares the value of the input signal with the track record input information stored in the input information storage unit 2, judges whether or not the value of the input signal is within the ever experienced data range having a track record, and if the value of the input signal is within the data range, causes the artificial intelligence control unit 4 to control the control target, and if the value of the input signal is not within the data range, stops the transmission of the input signal to the artificial intelligence control unit 4 and switches to manual control, in which control without using artificial intelligence is performed by the non-artificial intelligence control unit 5.

According to the present embodiment, the range of the ever experienced input signal having a track record is stored, whether or not the value of the input signal is within the range is judged, and if the value of the input signal is not within the range of the ever experienced content, transmission of a new input signal to the artificial intelligence control unit 4 is stopped and the control method is switched to manual control as a control without using artificial intelligence, and hence a control method using artificial intelligence in which the content of processing is often unclear performs processing of emergency response control as well as in consideration of the possibility of performing an abnormal operation even if the input signal is normal, and is capable of reducing abnormal control by the control device using artificial intelligence, thereby achieving both performance and safety.

Seventh Embodiment

Figure 22:
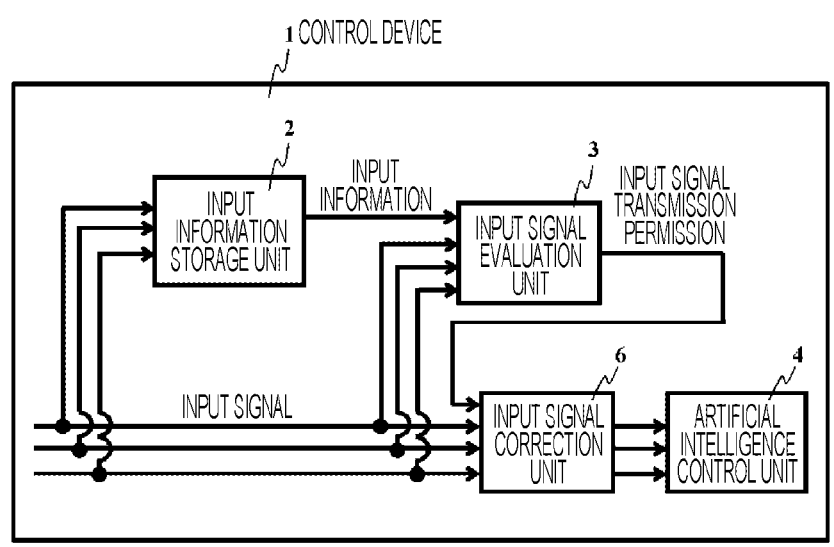
FIG. 22 is a block diagram of the control device according to a seventh embodiment.

FIG. 22 is a block diagram of the control device according to the seventh embodiment.

As illustrated in FIG. 22, the control device according to the present embodiment is different from the one presented in the first embodiment in terms of having an input signal correction unit 6. The input information storage unit 2 and the input signal evaluation unit 3 perform the same processing as that presented in the fourth embodiment. Then, the input signal evaluation unit 3 compares the value of the input signal with the track record input information stored in the input information storage unit 2, judges whether or not the value of the input signal is within the range of the ever experienced content, and if the value of the input signal is not within the range of the ever experienced content, the input signal correction unit 6 modifies the value of the input signal within the range of the ever experienced content in response to an instruction from the input signal evaluation unit 3.

Figure 23:
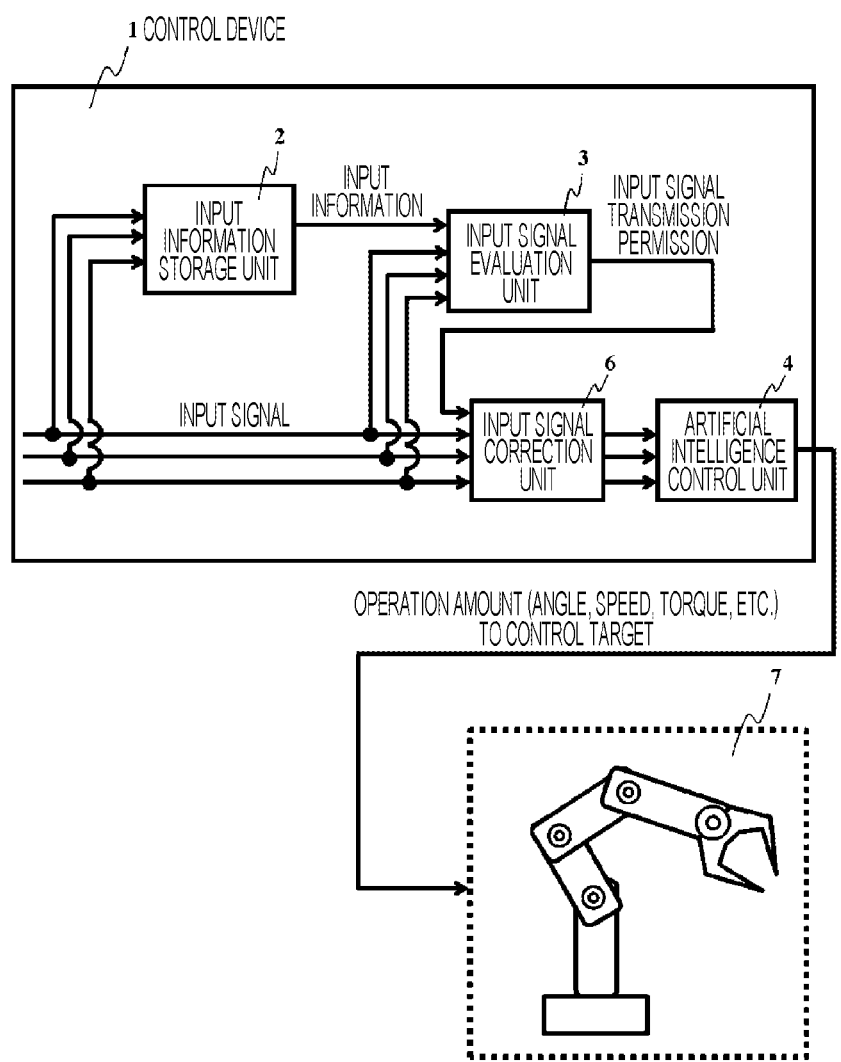
FIG. 23 is a diagram illustrating an embodiment in which a robot is controlled by the control device illustrated in FIG. 22.

FIG. 23 is a diagram illustrating an embodiment in which a robot is controlled by the control device 1 illustrated in FIG. 22.

As illustrated in FIG. 23, when the robot 7 is controlled by the control device 1 illustrated in FIG. 22, the artificial intelligence control unit 4 or the non-artificial intelligence control unit 5 calculates the operation amount (e.g., target angle, target speed, target torque, etc.) for controlling the robot 7, and the robot 7 is controlled in accordance with the operation amount.

Figure 24:
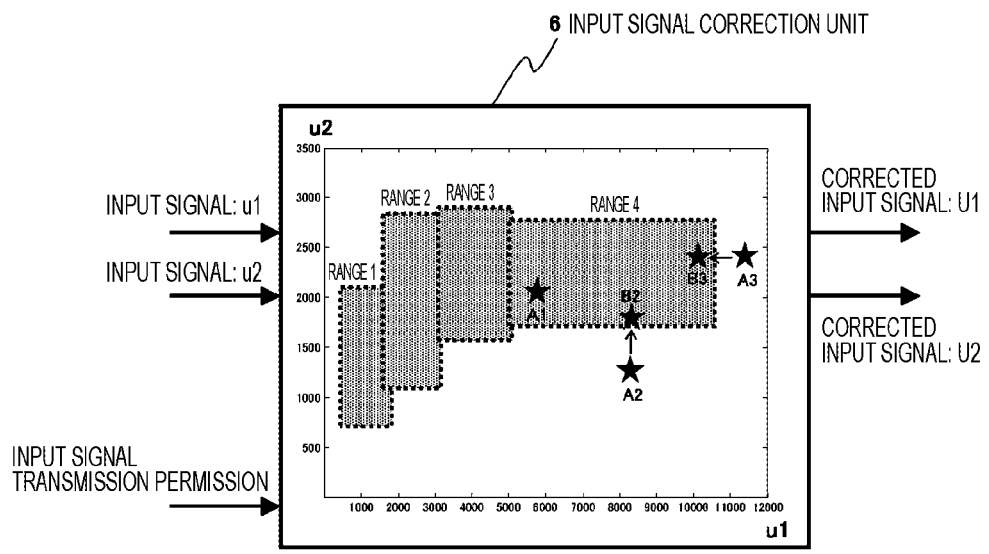
FIG. 24 is a diagram for explaining an example of processing in an input signal correction unit illustrated in FIG. 22.

FIG. 24 is a diagram for explaining an example of processing in the input signal correction unit 6 illustrated in FIG. 22.

When the input signal evaluation unit 3 judges that the input signal is not within the range of the ever experienced content, as described above, the input signal correction unit 6 according to the present embodiment modifies the value of the input signal within the range of the ever experienced content. Specifically, as illustrated in FIG. 24, when the vector value of the input signal is A1, which is within the range 4, the corrected input signals U1 and U2 are the input signals u1 and u2. When the vector value of the input signal is A2 or A3, which is not within the range 4, the input signal correction unit 6 sets the corrected input signals U1 and U2 to B2 and B3, which are values corrected so as to fall within the range 4. Note that B2 is a vector within the range closest to A2, and B3 is a vector within the range closest to A3.

According to the present embodiment, the range of the ever experienced input signal having a track record is stored, whether or not the value of the input signal is within the range is judged, and if the value of the input signal is not within the range of the ever experienced content, the input signal is modified to the range of the ever experienced content having a track record, and hence a control method using artificial intelligence in which the content of processing is often unclear performs processing in consideration of the possibility of performing an abnormal operation even if the input signal is normal, and is capable of reducing abnormal control by the control device using artificial intelligence, thereby achieving both performance and safety.

Eighth Embodiment

Figure 25:
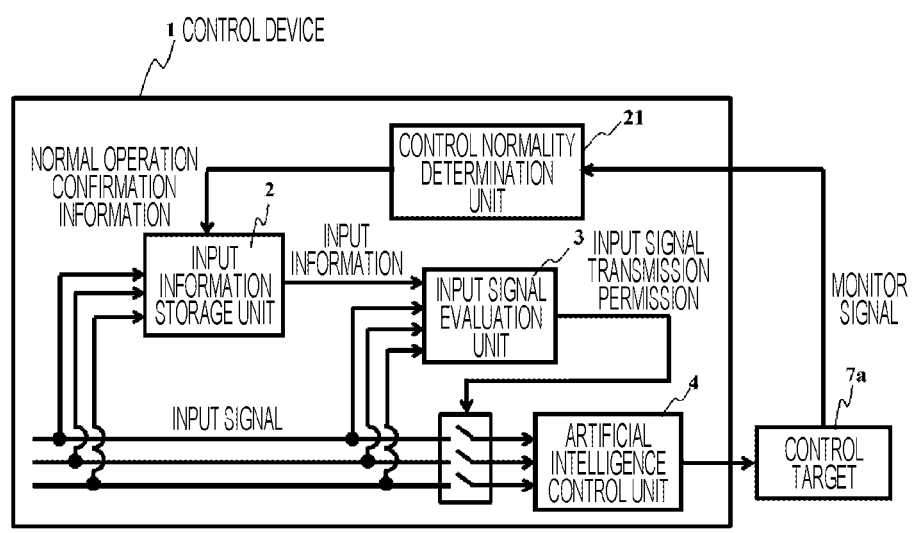
FIG. 25 is a block diagram of the control device according to an eighth embodiment.

FIG. 25 is a block diagram of the control device according to the eighth embodiment.

As illustrated in FIG. 25, the control device according to the present embodiment is different from that presented in the first embodiment in terms of having a control normality determination unit 21 that determines whether or not the control performed for a control target 7a by the artificial intelligence control unit 4 on the basis of the input signal is normal as well as the processing in the input information storage unit 2. The control normality determination unit 21 determines whether or not the control performed for the control target 7a by the artificial intelligence control unit 4 on the basis of the input signal is normal, and transmits confirmation information thereof to the input information storage unit 2.

Figure 26:
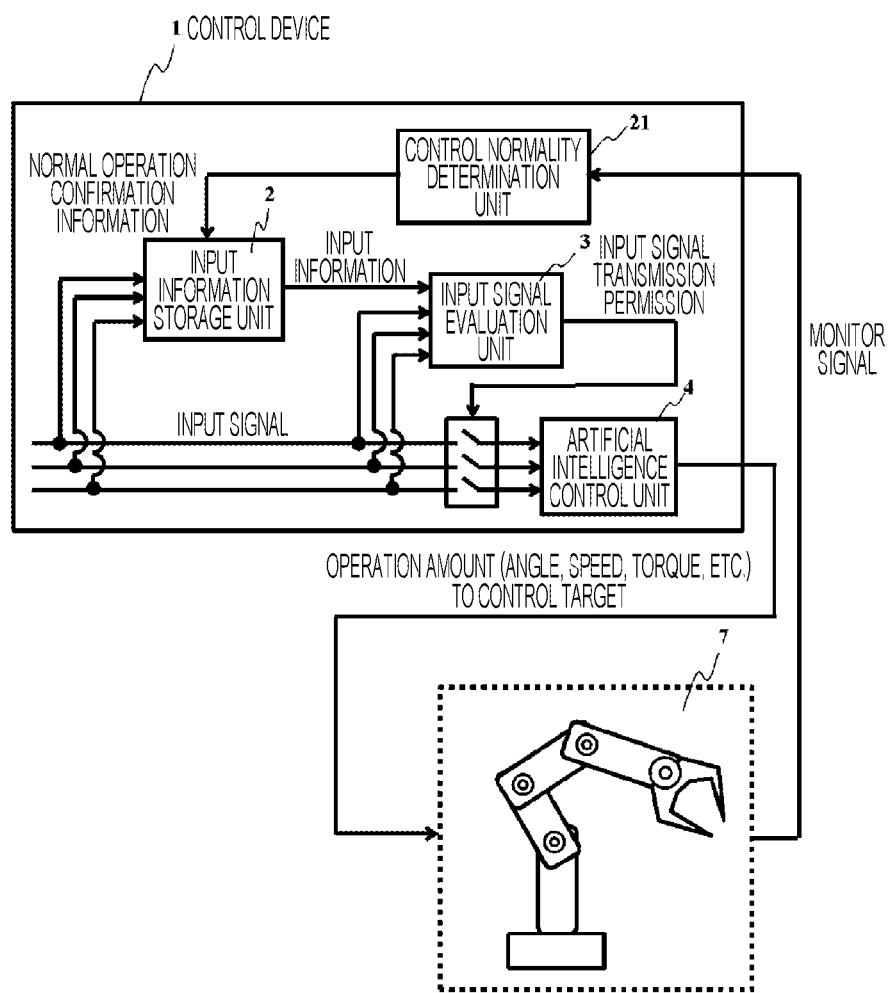
FIG. 26 is a diagram illustrating an embodiment in which a robot is controlled by the control device illustrated in FIG. 25.

FIG. 26 is a diagram illustrating an embodiment in which a robot is controlled by the control device 1 illustrated in FIG. 25.

As illustrated in FIG. 26, when a robot 7 is controlled by the control device 1 illustrated in FIG. 25, the artificial intelligence control unit 4 calculates an operation amount (e.g., target angle, target speed, target torque, etc.) for controlling the robot 7, and the robot 7 is controlled in accordance with the operation amount.

Figure 27:
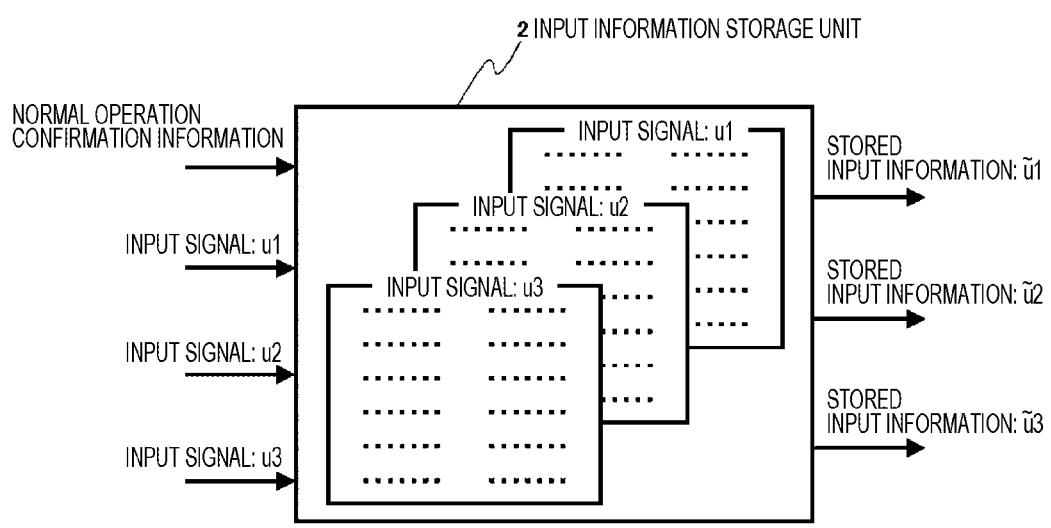
FIG. 27 is a diagram for explaining an example of processing in an input signal storage unit illustrated in FIG. 25.

FIG. 27 is a diagram for explaining an example of processing in an input signal storage unit 2 illustrated in FIG. 25.

The input signal storage unit 2 according to the present embodiment performs the processing of storing past information regarding the input signal. Specifically, as illustrated in FIG. 27, on the basis of normal operation confirmation information transmitted from the control normality determination unit 21, the input signal storage unit 2 stores, as track record input information, only the ever experienced input signals u1, u2, and u3 in which the normal operation is confirmed. The stored input information is output as U1, U2, and U3, respectively. The storage means may be separately provided externally.

In the case of the robot 7, the control normality determination unit 21 confirms a normal operation by judging a presence or absence of an abnormal operation, a presence or absence of a dangerous operation, or the like. The presence or absence of the abnormal operation and the presence or absence of the dangerous operation are not described in detail here because there are many known techniques and they are general methods.

According to the present embodiment, the control by artificial intelligence is permitted on the basis of whether or not the value of the input signal is within the range by track record input information regarding the input signal for which the control has been performed normally, and hence abnormal control by the artificial intelligence can be reduced.

Ninth Embodiment

Figure 28:
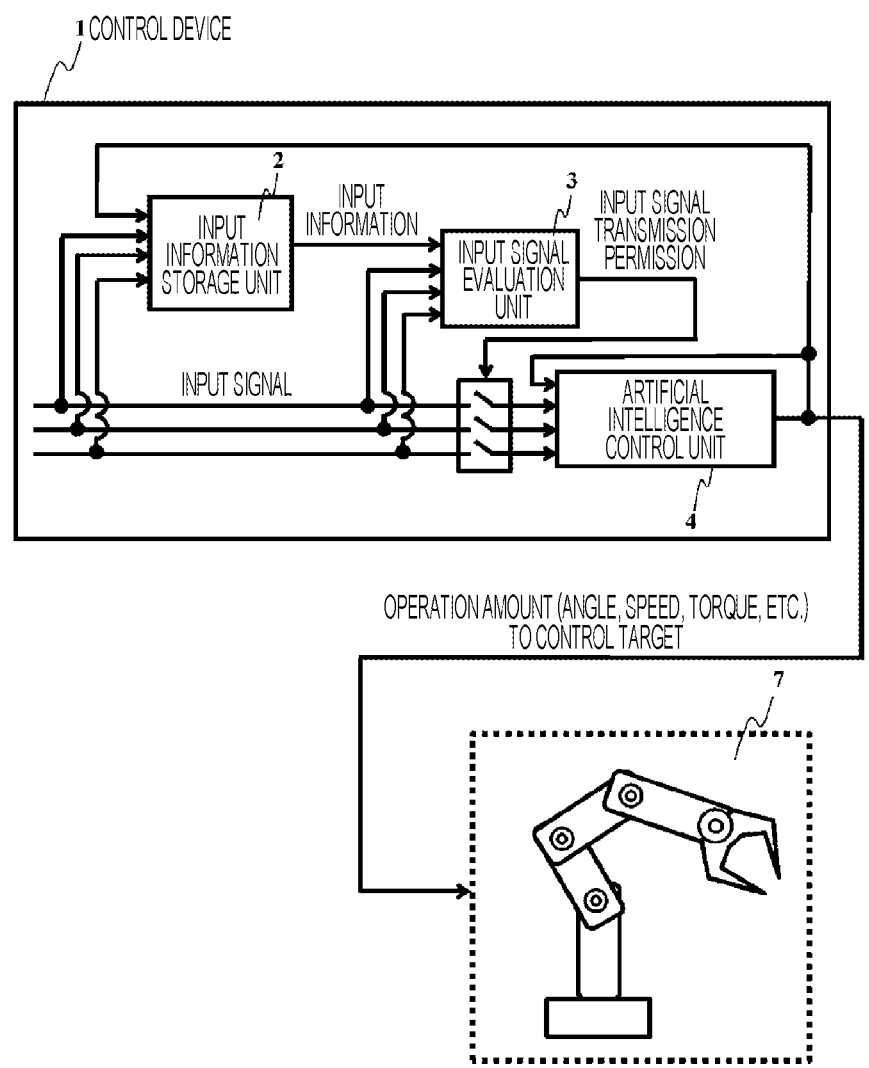
FIG. 28 is a block diagram of the control device according to a ninth embodiment.

FIG. 28 is a block diagram of the control device according to the ninth embodiment.

As illustrated in FIG. 28, the control device according to the present embodiment is different from that presented in the first embodiment in that the output signal having been output from the artificial intelligence control unit 4 for the purpose of controlling the control target robot 7 is input to the input information storage unit 2 and the artificial intelligence control unit 4.

The input information storage unit 2 according to the present embodiment stores combination track record input information regarding a combination of an input signal and a past output signal having been output from the artificial intelligence control unit 4. The input signal evaluation unit 3 determines whether or not to transmit the input signal to the artificial intelligence control unit 4 on the basis of the combination track record input information stored in the input information storage unit 2. As the determination method, the method presented in the above-described embodiment can be applied. Then, the artificial intelligence control unit 4 generates an output signal for controlling the robot 7 on the basis of the input signal and the past output signal for controlling the robot 7.

According to the present embodiment, when an output signal is generated on the basis of an input signal and a past output signal in the control using artificial intelligence, combination track record input information regarding the combination of the input signal and the past output signal is stored, and whether or not to perform control based on the input signal is determined, and hence abnormality control using the artificial intelligence can be reduced.

Tenth Embodiment

Figure 29:
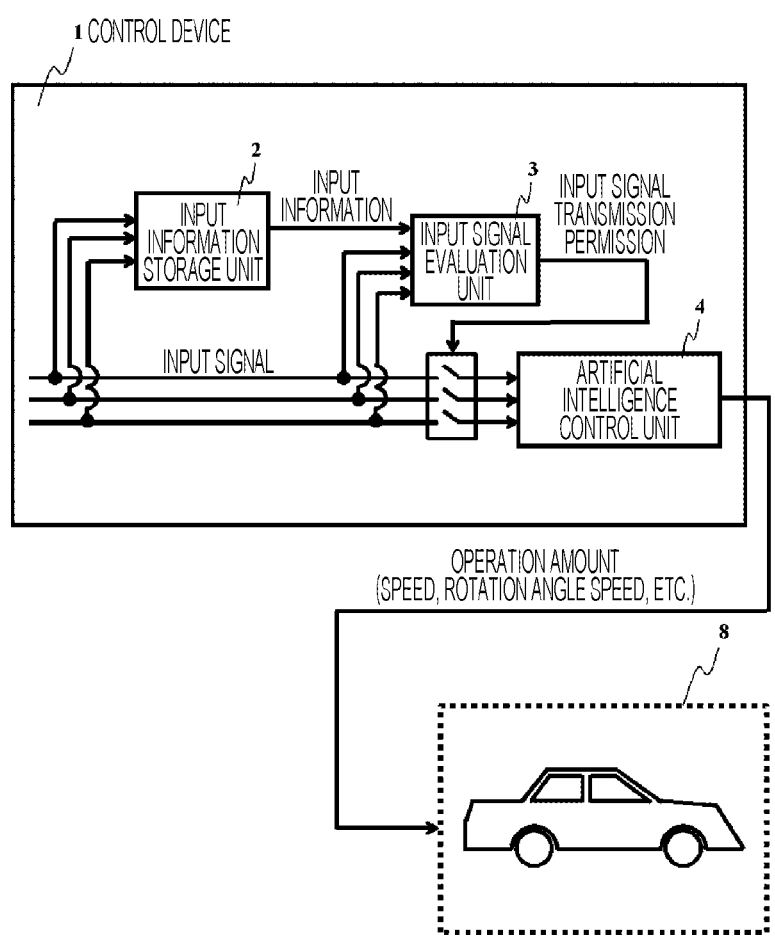
FIG. 29 is a diagram illustrating an example of controlling a control target by the control device according to a tenth embodiment.

FIG. 29 is a diagram illustrating an example of controlling the control target by the control device 1 according to the tenth embodiment.

In the present embodiment, as illustrated in FIG. 29, the control device 1 illustrated in FIG. 1 controls an automatic driving vehicle 8 as a control target. The input information storage unit 2 and the input signal evaluation unit 3 perform the same processing as that presented in the fourth embodiment. The artificial intelligence control unit 4 calculates the operation amount (e.g., target speed, target rotation speed, etc.) for controlling the automatic driving vehicle 8.

According to the present embodiment, the range of the ever experienced input signal is stored, whether or not the value of the input signal is within the range is judged, and if the value of the input signal is within the range, permits transmission of the input signal to the artificial intelligence control unit 4, and hence a control method using artificial intelligence in which the content of processing is often unclear performs processing in consideration of the possibility of performing an abnormal operation even if the input signal is normal, and is capable of reducing abnormal control by the control device using artificial intelligence, thereby achieving both performance and safety. If the value of the input signal is not within the range, the operations of the steering wheel, the accelerator, the brake, and the like are switched to those by the driver.

Eleventh Embodiment

Figure 30:
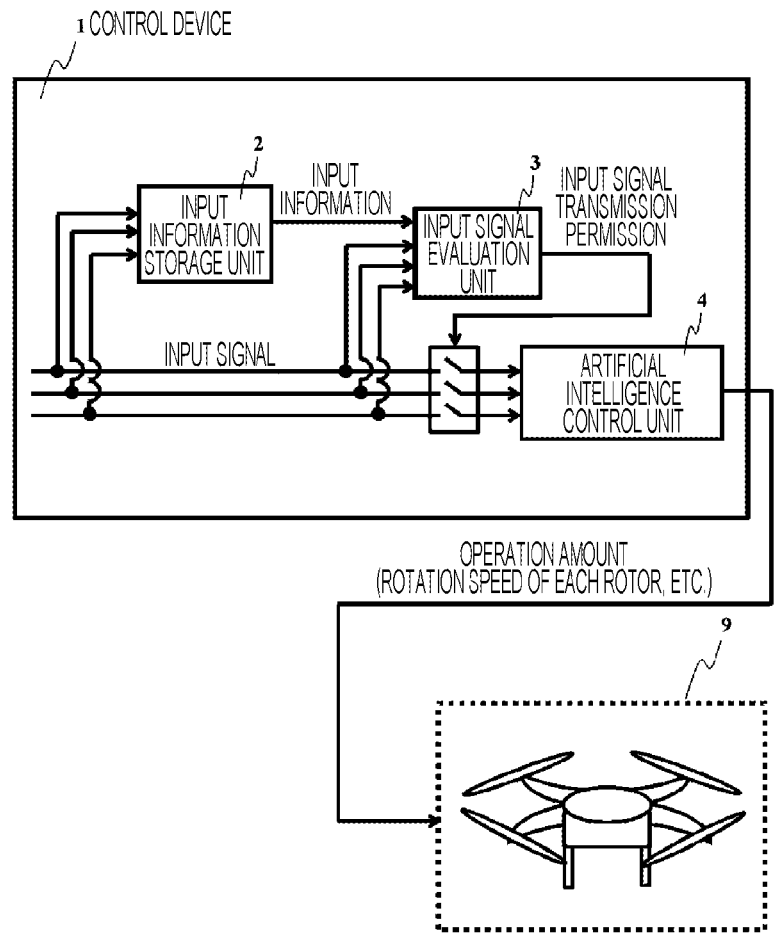
FIG. 30 is a diagram illustrating an example of controlling a control target by the control device according to an eleventh embodiment.

FIG. 30 is a diagram illustrating an example of controlling a control target by the control device 1 according to the eleventh embodiment.

In the present embodiment, as illustrated in FIG. 30, the control device 1 illustrated in FIG. 1 controls a drone 9 as a control target. The input information storage unit 2 and the input signal evaluation unit 3 perform the same processing as that presented in the fourth embodiment. The artificial intelligence control unit 4 calculates the operation amount (e.g., target rotation speed of each rotor, etc.) for controlling the drone 9.

According to the present embodiment, the range of the ever experienced input signal is stored, whether or not the value of the input signal is within the range is judged, and if the value of the input signal is within the range, permits transmission of the input signal to the artificial intelligence control unit 4, and hence a control method using artificial intelligence in which the content of processing is often unclear performs processing in consideration of the possibility of performing an abnormal operation even if the input signal is normal, and is capable of reducing abnormal control by the control device using artificial intelligence, thereby achieving both performance and safety.

Twelfth Embodiment

Figure 31:
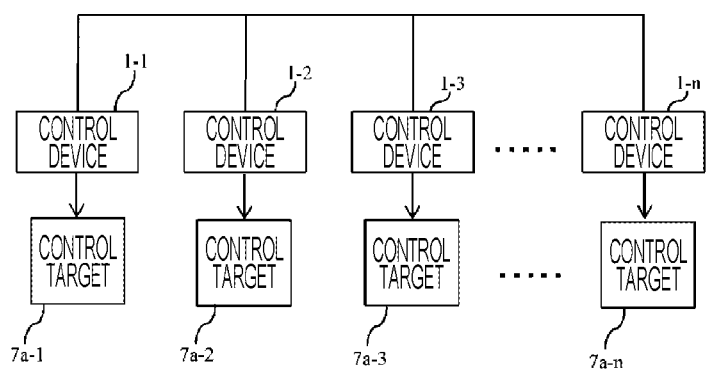
FIG. 31 is a diagram illustrating a control system according to a twelfth embodiment.

FIG. 31 is a diagram illustrating a control system according to the twelfth embodiment. The control system according to the twelfth embodiment, as illustrated in FIG. 31, a plurality of control devices 1-1 to 1-$n$ having the above-described configuration are communicably connected, and each control device controls control targets 7$a$-1 to 7$a$-$n$ of the same kind. Each of the control devices 1-1 to 1-$n$ causes the input information storage unit 2 to mutually notify the other control devices of the track record input information of its own device and share the track record input information of its own device with the other control devices, thereby storing the track record input information regarding the other control devices, causes the input signal evaluation unit 3 to permit the input signal to be transmitted to the artificial intelligence control unit 4, on the basis of the track record input information, when the value of the input signal is within the range having a track record in at least one control device of the plurality of control devices, and causes the artificial intelligence control unit 4 to control the control targets 7$a$-1 to 7$a$-1.

According to the present embodiment, whether or not to perform the control by artificial intelligence is judged on the basis of the past track records in the plurality of control devices, and hence it is possible to increase the cases in which the control with the past track record by the artificial intelligence can be applied, and it is possible to achieve sharing of a track record only by the plurality of control devices by the plurality of control devices mutually sharing the information of the range of the input signal with the past track record.

Thirteenth Embodiment

Figure 32:
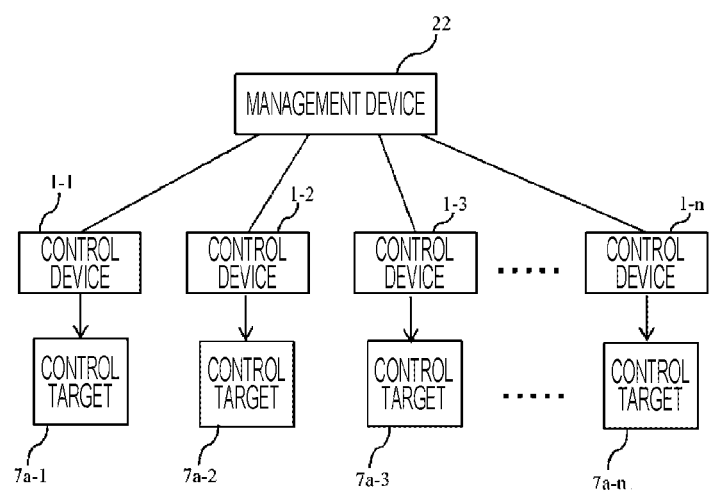
FIG. 32 is a diagram illustrating a control system according to a thirteenth embodiment.

FIG. 32 is a diagram illustrating a control system according to the thirteenth embodiment. As illustrated in FIG. 32, the control system according to the thirteenth embodiment is configured such that the plurality of control devices 1-1 to 1-$n$ having the above-described configuration and a management device 22 are communicably connected. The management device 22 acquires, by communication, individual track record input information, which is information regarding individual input signals having past track records in the plurality of control devices 1-1 to 1-$n$, generates track record input information indicating the range having a track record in at least one control device of the plurality of control devices 1-1 to 1-$n$ on the basis of the plurality of pieces of individual track record input information, and notifies the plurality of control devices 1-1 to 1-$n$ of the generated track record input information. Then, the plurality of control devices 1-1 to 1-$n$ having received the track record input information transmitted from the management device 22 store, in the input information storage unit 2, the track record input information having been notified by being transmitted from the management device 22.

According to the present embodiment, the management device 22 aggregates the information of the plurality of control devices 1-1 to 1-$n$, and notifies the plurality of control devices 1-1 to 1-$n$ of the information of the range of input signal having a track record in at least one control device, and hence the plurality of control devices 1-1 to 1-$n$ can easily share the track records. Furthermore, the management device 22 collectively manages the track record input information, and hence addition or deletion of a control device becomes easy.

REFERENCE SIGNS LIST 1, 1-1 to 1-$n$ control device
2 input information storage unit 3 input signal evaluation unit
4 artificial intelligence control unit
5 non-artificial intelligence control unit
5a switch unit
6 input signal correction unit
7 robot
7a, 7-1 to 7-n control target
8 automatic driving vehicle
9 drone
11 storage device
12 CPU
13 ROM
14 RAM
15 data bus
16 input circuit
17 input/output port
18 output circuit
21 control normality determination unit
22 management device
108 pre-processing unit
109 predetermined range generation unit

The invention claimed is:

1. A control device, comprising:
an input information storage unit configured to store track record input information from a sensor, the track record input information comprising an input signal;
an artificial intelligence controller configured to receive the track record input information from the input information storage unit and control a control target using artificial intelligence based on the input signal;
an input signal evaluation processor configured to determine whether a value of the input signal is within a range having a track record based on the track record input information and, if the value of the input signal is within the range having the track record, permit transmission of the input signal to the artificial intelligence controller;
a non-artificial intelligence controller configured to control the control target without using the artificial intelligence; and
a switch configured to switch between the artificial intelligence controller and the non-artificial intelligence controller in controlling the control target,
wherein the input signal evaluation processor (i) controls the switch to cause the artificial intelligence controller to control the control target when the value of the input signal is within the range having the track record, and (ii) controls the switch to cause the non-artificial intelligence controller to control the control target when the value of the input signal is not within the range having the track record, and
wherein the input signal evaluation processor outputs a voice indicating a switching of the switch.

2. The control device according to claim 1, wherein:
the input information storage unit calculates a maximum value and a minimum value of the input signal, and stores the maximum value as an upper limit value and the minimum value as a lower limit value; and
the input signal evaluation processor permits transmission of the input signal to the artificial intelligence controller when a value of the input signal is equal to or greater than the lower limit value and equal to or smaller than the upper limit value.

3. The control device according to claim 1, wherein:
the input information storage unit calculates an approximate function that approximates a value of the input signal and stores the value of the input signal approximated by the approximate function as a proximate value of the input signal; and
the input signal evaluation processor permits transmission of the input signal to the artificial intelligence controller when a difference between the value of the input signal and the proximate value of the input signal is within a predetermined range.

4. The control device according to claim 1, wherein:
the input information storage unit clusters values of the input signal, divides the values of the input signal into one or more data sets, determines a data range related to the one or more data sets, and stores information of the data range; and
the input signal evaluation processor permits transmission of the input signal to the artificial intelligence controller when at least one of the values of the input signal is within the data range.

5. The control device according to claim 1, further comprising:
an input signal correction processor configured to correct a value of the input signal to a value within the range having the track record, wherein
the input signal evaluation processor causes the input signal correction processor to correct the value of the input signal when the value of the input signal is not within the range having the track record.

6. The control device according to claim 1, further comprising:
a control normality determination processor configured to determine whether or not control having been performed for the control target by the artificial intelligence controller based on the input signal is normal, wherein
the input information storage unit stores the track record input information regarding the input signal for which control has been determined to be normal by the control normality determination processor.

7. The control device according to claim 1, wherein:
the artificial intelligence controller generates an output signal for controlling the control target based on the input signal and a past output signal for controlling the control target;
the input information storage unit stores combination track record input information comprising a combination of the input signal and the past output signal; and
the input signal evaluation processor determines whether or not to permit transmission of the input signal to the artificial intelligence controller based on the combination track record input information.

8. The control device according to claim 1, wherein:
the input information storage unit stores, if there are a plurality of control devices that control a plurality of control targets, track record input information regarding the plurality of control devices; and
the input signal evaluation processor permits transmission of the input signal to the artificial intelligence controller based on the track record input information, when a value of the input signal is within the range having the track record in at least one of the plurality of control devices.

9. The control device according to claim 8, wherein:
the control device is communicable with the plurality of control devices;
the input information storage unit notifies the plurality of control devices of track record input information of the control device and shares the track record input information of the control device with the plurality of control devices; and the input signal evaluation processor determines whether or not to permit transmission of the input signal to the artificial intelligence controller based on track record input information of the plurality of control devices.

* * * * *